UNITED STATES PATENT OFFICE.

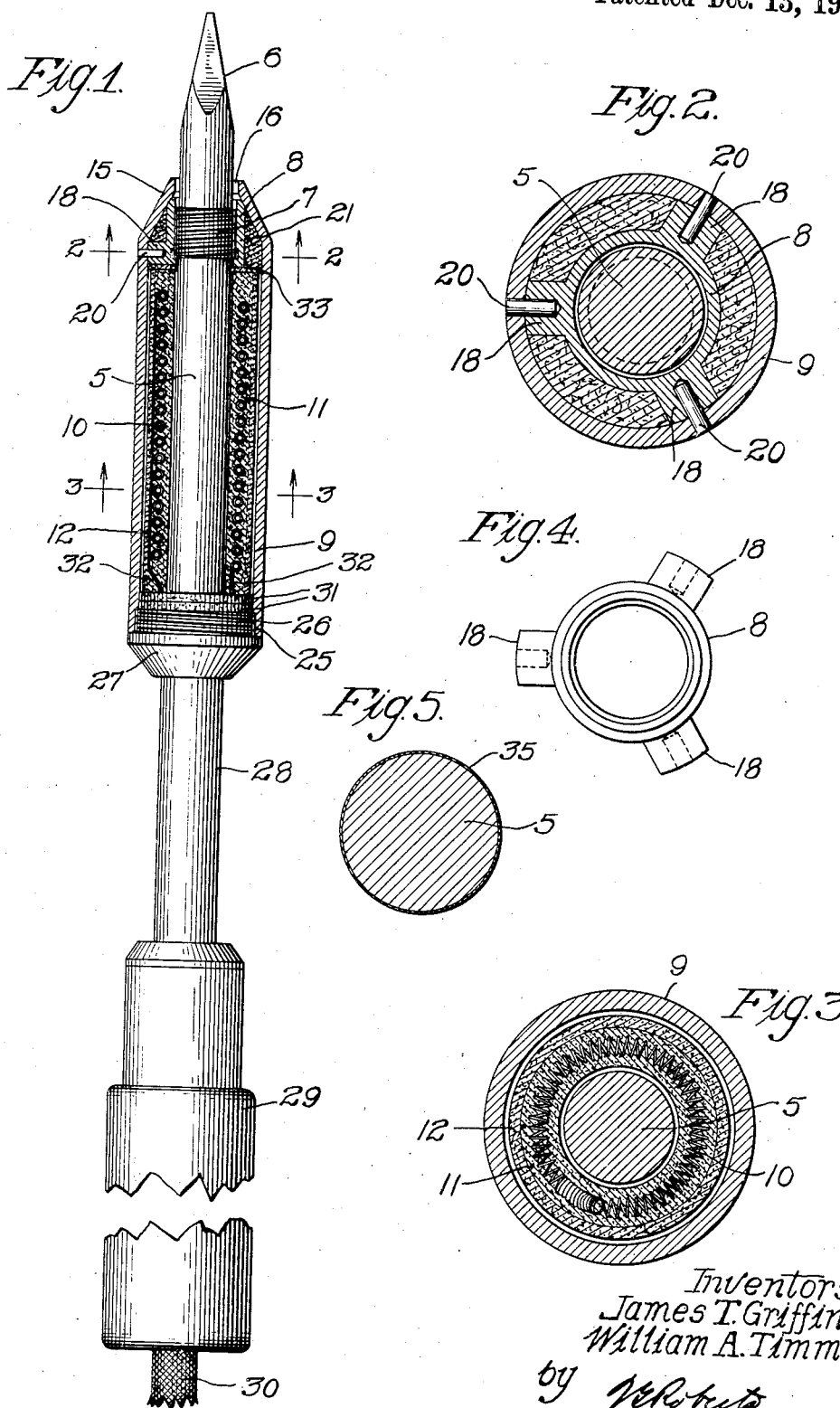

JAMES T. GRIFFIN, OF OAK PARK, AND WILLIAM A. TIMM, OF BERWYN, ILLINOIS, ASSIGNORS TO WESTERN ELECTRIC COMPANY, INCORPORATED, OF NEW YORK, N. Y., A CORPORATION OF NEW YORK.

ELECTRICALLY-HEATED SOLDERING-IRON.

1,400,156. Specification of Letters Patent. Patented Dec. 13, 1921.

Application filed July 17, 1919. Serial No. 311,499.

*To all whom it may concern:*

Be it known that we, JAMES T. GRIFFIN and WILLIAM A. TIMM, citizens of the United States, residing at Oak Park, in the county of Cook and State of Illinois, and Berwyn, in the county of Cook and State of Illinois, respectively, have invented certain new and useful Improvements in Electrically-Heated Soldering-Irons, of which the following is a full, clear, concise, and exact description.

This invention relates to electrically heated soldering irons, and its object is to produce a soldering iron in which the heat of the heating unit will be directed to the soldering tip without waste by radiation, thereby enabling the heating unit to be worked at a much lower temperature than has heretofore been possible, whereby the cost of operating the iron will be reduced to a minimum, and the deterioration of the heating element from burning out will also be reduced.

In accordance with the general features of this invention the heating unit and the conducting core, through which the heat is carried to the tip, are so separated and insulated from the outside shell in which they are located that the loss of heat by radiation is greatly reduced. In the preferred form of this invention the heating unit is separated from the outside casing by means of heat insulating material, and the conducting core, through which the heat is carried to the tip of the iron, is so mounted in this casing that a minimum amount of metal will come between the core and the casing, thereby reducing the radiating surface through which the heat from the core might be transmitted to the casing.

In the drawings illustrating this invention—

Figure 1 is a view showing a section through the working parts of the iron;

Fig. 2 is a sectional view taken upon line 2—2 of Fig. 1;

Fig. 3 is a sectional view taken upon line 3—3 of Fig. 1;

Fig. 4 is a detail view of the means for supporting the core within the casing, and Fig. 5 is an enlarged cross-sectional view through the core itself indicating a non-oxidizable coating thereon.

As shown in the drawings, 5 designates a heat conducting core upon the outer end of which is provided a conventional soldering tip 6. Near its outer end the core 5 is provided with screw threads 7 adapted to engage internal screw threads in a supporting member or nut 8 by means of which it is removably held within a casing 9. Located within the casing 9 and surrounding the core 5 is a heating unit comprising a helically wound heat generating coil 10 embedded in a cylindrical spool 11 of refractory material such as alundum cement. Applied while in a plastic condition to the outside of the spool 11 is a layer 12 of some suitable heat insulating material mixed with gum arabic. The location of this layer 12 of insulation outside of the heating unit and inside of the casing 9 prevents the heat from the heating unit reaching this casing and being radiated into the open air and causes it to be directed against the core 5 through which it is transmitted to the tip 6.

At its outer end the casing 9 is spun over into a conical form, as indicated at 15, and has an opening 16 therethrough through which the tip 6 of the core 5 extends without touching the walls of the casing 9. Located within this end of the casing 9 is the supporting member or nut 8 which is screw threaded to receive the threaded portion 7 of the core 5. As shown, this supporting member or nut 8 is provided with three radially extending lugs 18—18 which are adapted to bear against the inside of the wall of the casing 9 and to be secured thereto by means of pins 20—20. An extended cylindrical portion 21 of this supporting member engages at its margin the inside of the tapered or conical portion 15 of the casing 9, the surface of engagement being limited to a very small area. Packed around this supporting member 8 between the cylindrical portion and the wall of the casing 9 and between the supporting lugs 18—18 of the nut 8 is a suitable heat insulating material mixed with gum arabic. This confines the heat generated to the core 5 and prevents it reaching the wall of the casing 9 except through the very small radiating surface of the lugs 18—18 and the end of the cylindrical portion 21.

At its inner end the casing 9 is provided with an internal screw threaded portion 25 adapted to engage a screw threaded portion 26 on the enlarged end 27 of a stem 28 which is connected with a handle 29 through which conductors 30 may be led to the heating unit. Insulating washers 31—31 of asbestos are inserted between the end of the core 5 and the end of the stem 28 and leads 32—32 are led through these washers to the connecting terminals (not shown) within the stem portion 28 of the iron. An insulating washer 33 of asbestos may also be inserted between the end of the heating unit and the supporting member or nut 8.

A thin coating 35 of nickel is applied to the core 5 of the soldering iron to prevent oxidation of this core and preserve its heat conducting qualities.

The core 5 may be removed for replacement by unscrewing it from the supporting member 8. The heating unit may be removed by unscrewing the shell 9 from the stem 28.

It will be apparent that with an iron made in accordance with this invention, in which the heating unit is thoroughly insulated by heat insulating material from the shell to the iron, the heat generated in the heating unit will be substantially all directed against the conducting core, and that by means of the method of mounting the core, whereby but a very small portion of it is in metallic connection with the outside casing, the maximum heat will be directed from the heating unit into the conducting core, thus providing a construction in which the heating unit may be worked at a lower temperature and at a lower current consumption, thereby prolonging the life of the iron and enabling the use of materials for the heating unit which it has heretofore been found impossible to use for this purpose.

What is claimed is:

1. In an electrically heated soldering iron, a heat conducting core having an extension thereon constituting a soldering tip, a heating unit surrounding said core, a casing surrounding said heating unit and having an open end beyond which the tip portion of the core extends, and a supporting member for said core comprising a plurality of radially extending arms secured to the casing wall and a cylindrical portion in engagement with said wall only at its end.

2. In an electrically heated soldering iron, a heat conducting core having an extension thereon constituting the soldering tip, a heating unit surrounding said core, a casing surrounding said heating unit and having an open end beyond which the tip portion of the core extends, a supporting member for said core having only a small portion of its surface area in contact with said casing, and heat insulating material between the major surface of said supporting member and said casing.

3. In an electrically heated soldering iron, a heat conducting core having an extension thereon constituting the soldering tip, a heating unit surrounding said core, a casing surrounding said heating unit and having an open end beyond which the tip portion of the core extends, heat insulating material interposed between said heating unit and said casing, a supporting member for said core having only a small portion of the surface area in contact with said casing, and heat insulating material interposed between the major surface of said supporting member and said casing.

4. In an electrically heated soldering iron, a heat conducting core having an extension thereon constituting a soldering tip and provided with a screw threaded portion intermediate its ends, a heating unit surrounding said core, a casing surrounding said heating unit and having an open end beyond which the tip portion of the core extends, and a supporting member for said core comprising an internally screw threaded sleeve adapted to engage the threads on said core to secure said core in place and a plurality of radially extending arms on said supporting member adapted to be secured to the casing wall.

In witness whereof, we hereunto subscribe our names this third day of July A. D., 1919.

JAMES T. GRIFFIN.
WILLIAM A. TIMM.